United States Patent
Cey

(10) Patent No.: US 7,562,631 B2
(45) Date of Patent: Jul. 21, 2009

(54) CROP RESIDUE AND SOIL CONDITIONING AGRICULTURAL IMPLEMENT

(75) Inventor: Brian Donald Cey, Saskatoon (CA)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/857,865

(22) Filed: Sep. 19, 2007

(65) Prior Publication Data

US 2009/0071383 A1    Mar. 19, 2009

(51) Int. Cl.
*A01C 5/00* (2006.01)
*A01C 7/00* (2006.01)
*A01C 9/00* (2006.01)

(52) U.S. Cl. .................... 111/167; 111/185; 111/188

(58) Field of Classification Search ......... 111/118–129, 111/149–170, 174, 177, 183–188
See application file for complete search history.

(56) References Cited

U.S. PATENT DOCUMENTS

| | | | |
|---|---|---|---|
| 340,103 A | 4/1886 | Courson | |
| 618,202 A | 1/1899 | Hanson et al. | |
| 769,101 A | 8/1904 | Mitchell | |
| 773,609 A | 11/1904 | Wagner | |
| 889,885 A | 6/1908 | Anderson et al. | |
| 953,982 A | 4/1910 | Steward | |
| 984,103 A | 2/1911 | Paul | |
| 1,026,760 A | 5/1912 | Michael | |
| 1,056,386 A | 3/1913 | Wheeler | |
| 2,244,774 A | 6/1941 | Hewitt | |
| 2,558,890 A | 7/1951 | White | |
| 3,195,650 A | 7/1965 | Watmough | |
| 4,262,752 A | 4/1981 | Parish | |
| 4,489,787 A | 12/1984 | Gary | |
| 5,622,124 A * | 4/1997 | Smith et al. | ........... 111/121 |
| 6,109,193 A | 8/2000 | Crabb et al. | |
| 6,237,696 B1 | 5/2001 | Mayerle | |
| 7,111,566 B2 | 9/2006 | Horn | |

\* cited by examiner

*Primary Examiner*—Christopher J. Novosad
(74) *Attorney, Agent, or Firm*—Rebecca Henkel

(57) ABSTRACT

A ground opener that is allowed to caster in one direction is associated with a pair of arms connected by a pivot connection that allows one arm to move relative to the other arm. The movable arm is forced against the stationary arm when the ground opener impacts the soil as the ground opener is pulled along a relatively straight travel path. When the ground opener is turned radially from the straight travel path, the movable arm may cast away from the stationary arm. The disc opener is coupled to the movable arm through a central hub and, as such, the trailing edge of the disc opener will move away from the stationary arm as the disc opener is turned. When the disc opener has completed the turn, the torque on the disc opener will lessen thereby allowing the movable arm to move back toward the stationary arm.

14 Claims, 4 Drawing Sheets

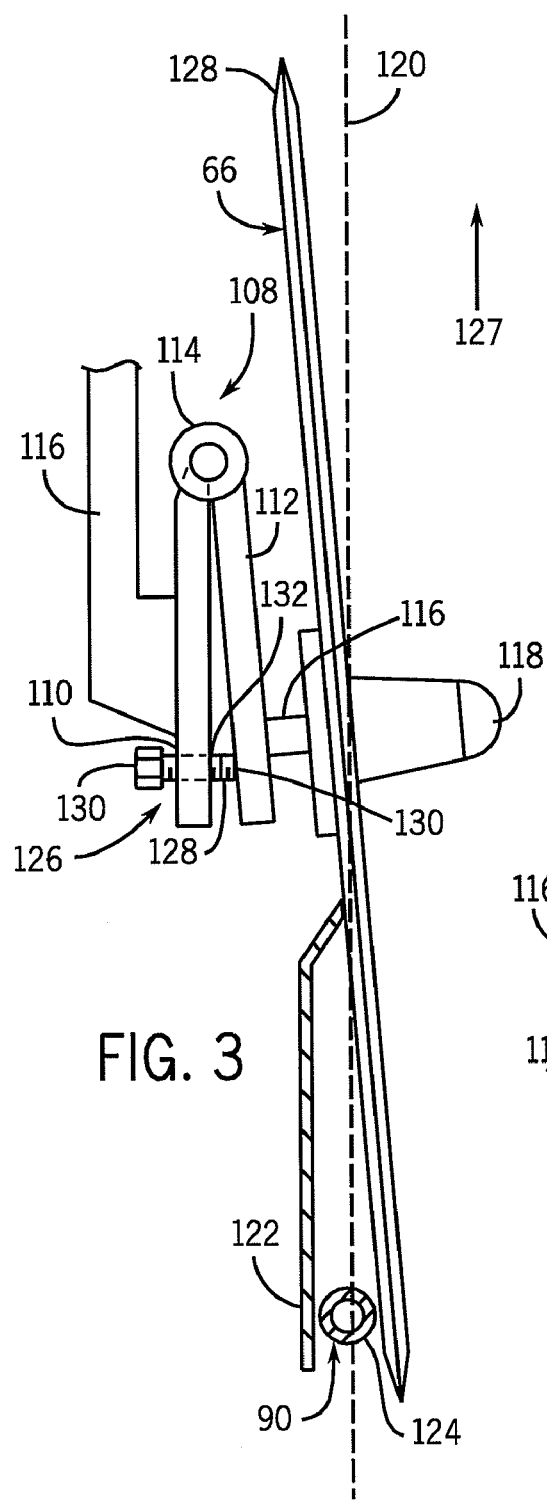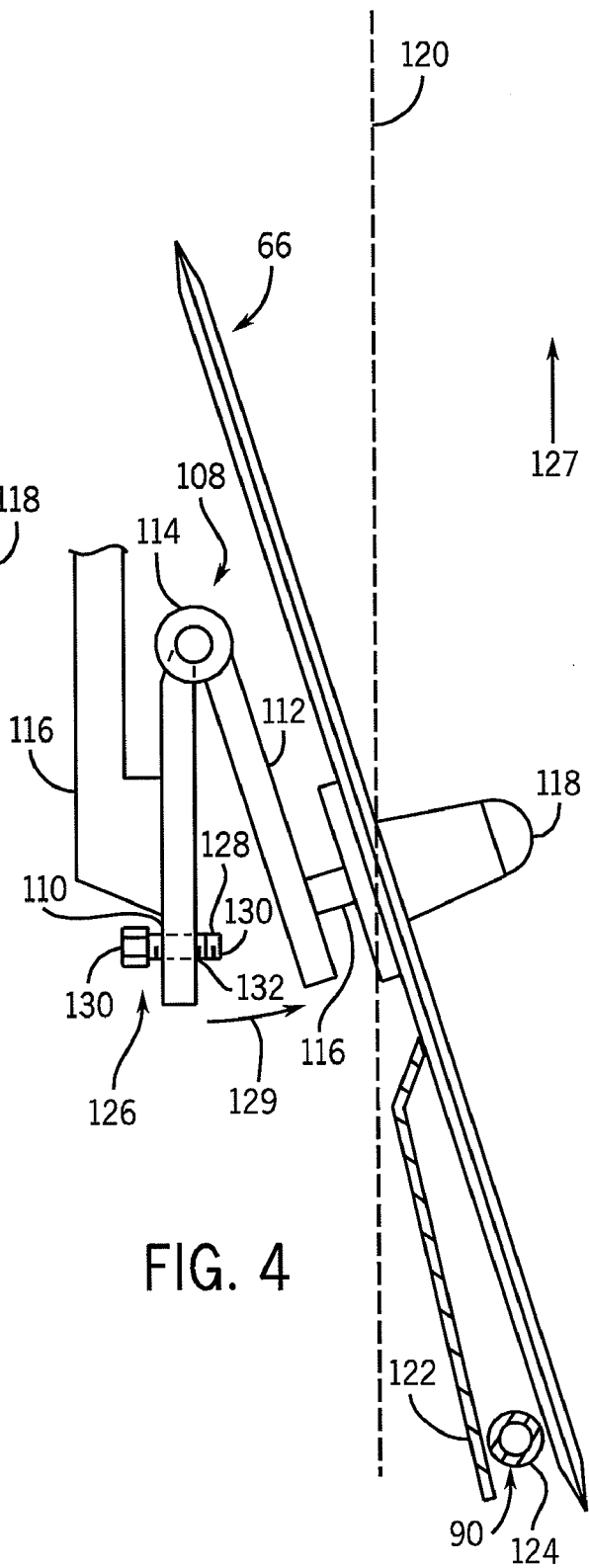
FIG. 3
FIG. 4

CROP RESIDUE AND SOIL CONDITIONING AGRICULTURAL IMPLEMENT

FIELD OF THE INVENTION

The present invention relates generally to agricultural implements, and in particular, to a seed planting unit having disc reels that can freely caster in one direction.

BACKGROUND OF THE INVENTION

Conventional seed planting systems includes a series of spaced coulters or reels that prepare a seed bed and deposit seed into the seed bed as the seed planting system is pulled, by a tractor, for example, along a relatively straight path of travel. Customarily, when it is necessary to turn from the straight travel path, a lift mechanism must be operated to lift the coulters above the ground so that damage is not caused to the coulters during the turning. Once the seed planting system is realigned with the straight travel path, the lift mechanism can be operated to lower the coulters to the ground.

The need to lift the coulters during radial turns from the straight travel path is necessary to avoid the torque that would be applied on the coulters by the ground if the coulters were otherwise left engaged with the ground during turning. More particularly, conventional coulters are constructed to have a fixed position generally angled relative to an axis extending along the straight travel path. When the seed planting system turns, the leading edge of the coulter initially scrapes across the ground and then may effectively dig into the ground. This can place a significant amount of torque on the coulters and significantly stress the coulter or the coupling used to connect the coulter to the disc frame.

SUMMARY OF THE INVENTION

The present inventors have discovered that the torque placed on a coulter or ground opener may be alleviated if the coulter is free to pivot or caster in a direction opposite the direction of the applied torque during turning of the seed planting system. In this regard, the present invention is directed to a ground opener that is allowed to caster in one direction. The ground opener is associated with a pair of arms connected by a pivot connection that allows one arm to move relative to the other arm. The movable arm is generally forced against the stationary arm by the impact of the ground opener with the soil as the ground opener is pulled along a relatively straight travel path. When the ground opener is turned radially from the straight travel path, the pivot connection effectively serves a fulcrum against which the disc opener is leveraged. To relieve the torque, the movable arm may cast away from the stationary arm. The disc opener is coupled to the movable arm through a central hub and, as such, the trailing edge of the disc opener will move away from the stationary arm as the disc opener is turned. When the disc opener has completed the turn and returns to a generally straight travel path, the torque on the leading edge of the disc opener will lessen thereby allowing the movable arm to move back toward the stationary arm.

In one embodiment, the stationary arm carries a stud that extends toward the movable arm and thereby provides a seat for the movable arm when the disc opener is moving along the straight travel path. Additionally, the stud prevents the disc opener from casting toward the stationary arm. Thus, in this embodiment, the disc opener is free to cast in only one direction.

It is contemplated that the stud may be of fixed length or may be screw that is threaded through the stationary arm. Use of a screw or similar device allows some variability in the amount of caster that is possible. More particularly, as the distance the body of the screw extends past the stationary arm and toward the movable arm increases, the amount of caster possible for the movable arm and thus the disc opener is reduced.

In another embodiment, the present invention is directed to a seed planting assembly having multiple disc openers arranged in a row. The disc openers are arranged such that two sets of disc openers are provided. One set of disc openers are designed to caster only in a clockwise direction and the other set of disc openers are designed to caster only in a counter-clockwise direction.

Accordingly, one object of the present invention is to provide a disc opener that is free to cast to reduce torque on the disc opener during radial turns from a straight travel path.

It is a further object of the present invention to provide a caster mounting assembly that allows variability in the amount of caster available to the disc opener during radial turns.

It is yet another object of the present invention to incorporate disc openers that are permitted to caster in only one direction into a seed planting assembly such that some of the disc openers are free to cast in one direction whereas others of the disc openers are free to caster in an opposite direction.

Therefore, in accordance with one aspect of the present invention, a ground opener for an agricultural planter movable along a direction of travel is presented. The ground opener includes an arm attachable to a frame of the agricultural planter and a disc mounted to the arm and adapted to form a furrow along the direction of travel. The ground opener further includes a stop pivotably mounted to the frame and adapted to allow the disc to caster in only one direction when the agricultural planter turns radially from the direction of travel.

In accordance with another aspect, an agricultural implement movable along a direction of travel includes a drill and a first set of coulters mounted to the drill and a second set of coulters linearly spaced from the first set of coulters and mounted to the drill. The first set of coulters are operative to caster in a counterclockwise direction when the farm implement turns in a counterclockwise direction relative to the direction of travel and the second set of coulters are operative to caster in a clockwise direction when the agricultural implement turns in a clockwise direction relative to the direction of travel.

According to yet another aspect, the present invention includes a mounting assembly for coupling a rotating disc to a drill used to furrow a field. The mounting assembly includes a stationary arm adapted to be coupled to the drill and a movable arm adapted to be coupled to the rotating disc. A pivot connection interconnects the stationary arm and the movable arm in a manner that allows the movable arm to pivot about the first connection.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 3 is a section view of the seed planting unit taken along lines 3-3 of FIG. 2;

FIG. 4 is a section view similar to that of FIG. 3 showing casting of a disc opener in one direction;

DETAILED DESCRIPTION OF THE PREFERRED EMBODIMENTS

Figure 1:
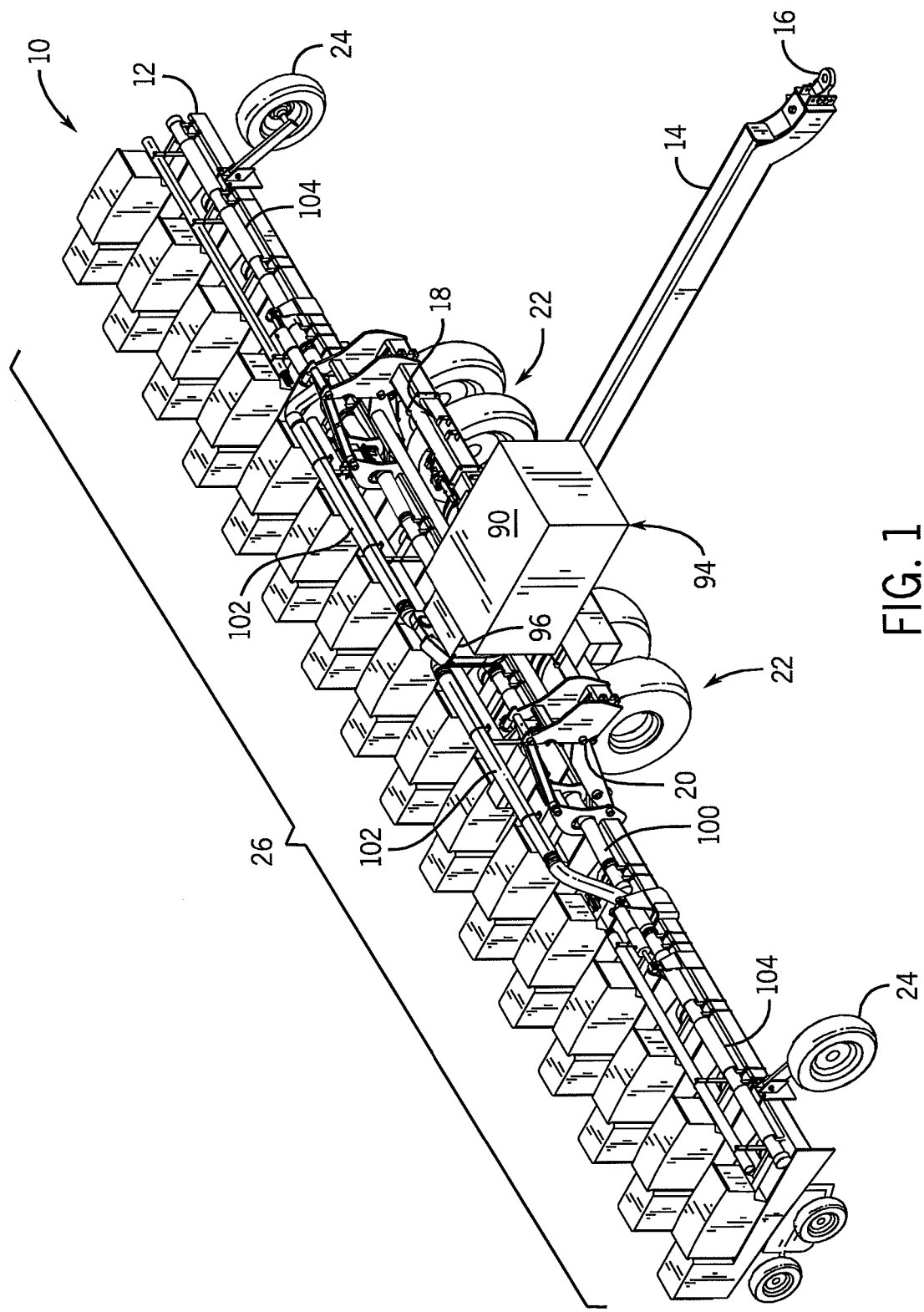
FIG. 1 is a schematic perspective view of a seed planting assembly supporting a plurality of seed planting units constructed in accordance with a preferred embodiment of the invention.

Referring to FIG. 1, a seed planting assembly 10 includes a laterally extending toolbar 12 connected at its middle (or other location) to a forwardly extending tow bar 14. Tow bar 14 includes a connector 16 disposed at its longitudinally forward end and configured to mate with a corresponding hitch, or the like, of a towing tractor (not shown). Toolbar 12 is supported by a chassis 18 that is connected to tow bar 14 via a hinged bracket assembly 20. Chassis 18 is supported on the ground by two pair of wheels 22. Outer portions of tool bar 12 are supported by outer wheels 24 having an adjustable height to thus control the height of the toolbar 12.

Figure 2:
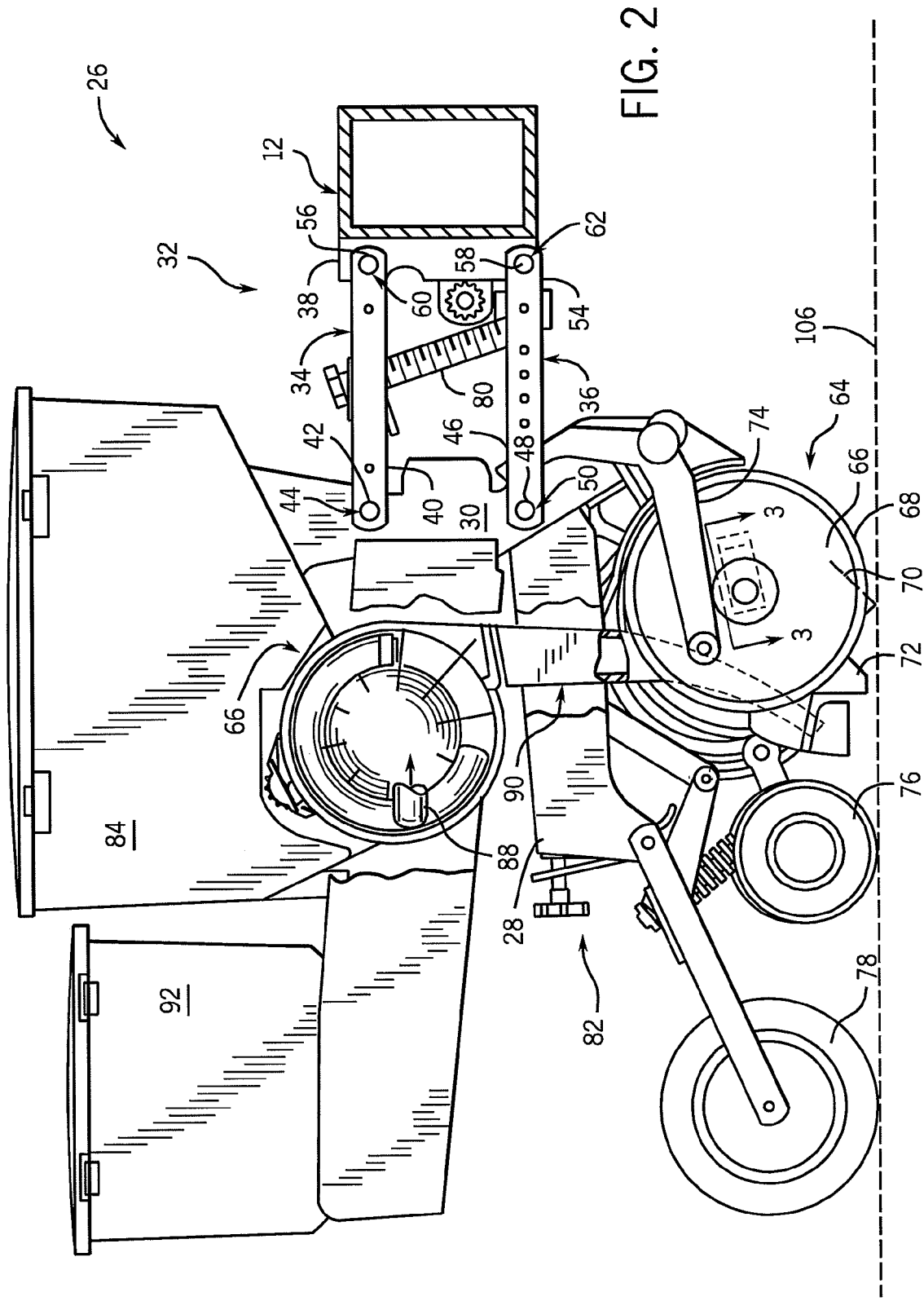
FIG. 2 is a side elevation view of a seed planting unit illustrated in FIG. 1.

A plurality of seed planting units (or row units) 26 extends longitudinally rearwardly from toolbar 12. In particular, referring also to FIG. 2, each planting unit 26 includes a frame 28 that is connected at its front end 30 to toolbar 12 via a mounting assembly 32. Mounting assembly 32 includes a pair of upper support beams 34 (one illustrated) and a pair of lower support beams 36 (one illustrated) that are hingedly connected to frame or drill 28 at one end, and to a mounting structure 38 at another end. Mounting structure 38 is, in turn, connected to tool bar 12.

Frame 28 defines a front end 30 having a first pair of aligned apertures (not numbered) extending laterally therethrough. Corresponding apertures (not numbered) extend through the rearward ends 40 of each upper support beam 34. A pin 42 extends through each pair of aligned apertures, and is fastened to provide a joint 44 that enables planting unit 26 to pivot about mounting assembly 32.

Likewise, the front end 30 of frame 28 defines a second pair of laterally extending apertures (not shown) disposed below the first pair of apertures. The second pair of apertures is laterally aligned with corresponding apertures (not shown) extending laterally through the rearward ends 46 of each lower support beam 36. A pin 48 extends through each pair of aligned apertures and is fastened to provide a joint 50 that enables planting unit 26 to pivot about mounting assembly 32.

Each upper support beam 34 further defines a forward end 52 that defines corresponding apertures (not shown) extending laterally therethrough. Likewise, each lower support beam 36 defines a forward end 54 that defines apertures (not shown) extending laterally therethrough. Mounting structure 38 extends rearwardly from tool bar 12, and defines laterally extending apertures (not shown) that are aligned with the apertures extending through forward ends 52 and 54. Upper and lower pins 56 and 58 extend through the corresponding apertures and form corresponding joints 60 and 62 that pivotally connect the forward ends 52 and 54 of support beams 34 and 36 to mounting structure 38.

It should thus be appreciated that while the right-hand side of mounting assembly 32 (taken with respect to a view from rear-to-forward) is illustrated as being mounted onto the right-hand laterally outer walls of frame 28, the left-hand side of mounting assembly 32 is likewise mounted onto the left-hand laterally outer walls of frame 28 in a symmetrical and parallel manner with respect to the right-hand side of the mounting assembly. Accordingly, while the left support beams 34 and 36 are connected to the left side of planting unit 26 and mounting structure 38 such that both pairs of beams 34 and 36 are parallel to each other during operation.

As is well-known in the art, planting units 26 are mounted in a side-by-side (lateral) relation relative to each other along the toolbar 12. While sixteen such row units are illustrated in FIG. 1, the present invention contemplates that more or less than sixteen row units can be assembled on a single toolbar 12 in accordance with a preferred embodiment. During operation, forward movement of the tractor causes row units 26 to ride along the ground, forming a plurality of seed trenches that receive seeds and are subsequently closed.

Referring again to FIG. 2, each planting unit 26 preferably includes a conventional seed trench opening assembly 64, each of which including a pair of laterally spaced seed trench opener discs 66 (also referred to as reels or coulters) that converge forwardly and downwardly to define a convergence point 68. A seed trench firming point 70 is disposed rearwardly from convergence point 68, and an opener shoe 72 is disposed rearwardly from seed trench firming point 70. Firming point 70 preferably extends slightly downwardly from the opener shoe 72, and firms the seed trench that is formed by convergence point 68. Firming point 70 and opener shoe 72 are preferably integrally connected. The depth of the seed trench can be controlled by a pair of gauge wheels (not shown) that are supported by gauge wheel arms 74 as understood by those having ordinary skill in the art. Alternatively, the planting unit 26 can be provided with a runner opener type for providing a seed trench in the ground as is appreciated by one having ordinary skill in the art. Planting unit 26 further includes a pair of seed trench closer discs 76 disposed rearwardly from opener shoe 72. A press wheel 78 is disposed rearwardly from closure discs 76.

A pair of screw and spring assemblies 80 (one shown) is displaced laterally from each other and extends downwardly from a first support member (not shown) extending laterally between the upper support beams 34 to a second support member (not shown) extending laterally between the lower support beams 36. Assemblies 80 are angled with respect to support beams 34 and 36, and can thus be actuated in a known manner to increase and decrease the down pressure exerted onto seed trench opening assembly 64 to control downward force on the opening discs 66, as is well understood by those having ordinary skill in the art. A knob 82 extends rearwardly from frame 28, and can be rotated to adjust the depth of gauge wheels (not shown) which control the desired seed trench depth as appreciated by one having ordinary skill in the art.

Planting unit 26 further includes a seed hopper 84 that provides storage for seed material that is to be gravitationally deposited into the seed trench that is formed as the seed trench opening assembly 64 moves across the field during operation. It should be appreciated, however, that a hopper container, smaller than container 84, can alternatively be connected to a centralized bin or large hopper in a conventional manner. In the illustrated embodiment, seeds are delivered from seed hopper 84 to a seed metering assembly 86 that acts under vacuum received by connector 88. The received seeds are then delivered into a seed tube 90 at a uniform rate. Seed tube 90 defines a conduit having an outlet end immediately downstream of firming point 70 and upstream of seed trench closer discs 76. Seed tube 90 thus receives seeds from metering assembly 86 and defines a substantially vertical passage through which the seeds are delivered through the opener shoe 72 and into the seed trench. The components of seed metering assembly 86 are further described in U.S. Pat. No. 6,109,193, the disclosure of which is hereby incorporated by reference. In a similar manner, seed hopper 84 may also be used to deposit fertilizer to the seed bed. Alternately, a separate hopper (not shown) containing fertilizer may be used.

During operation, as the tractor pulls the tool bar 12 across and over the ground, the seed trench opening assembly 64 opens a seed trench in the ground. Seeds from the hopper 84 flow into the seed metering assembly 86 in bulk and are subsequently deposited into the seed trench via seed delivery tube 90 at a controlled rate. The seed trench closer discs 76 trail the seed trench opening assembly 64 and, as the seed planting unit 26 is drawn across the field, close the seed trench together and over the seed dispensed by the seed metering assembly 86. The trailing press wheel 78 compacts the soil closed over the delivered seeds.

Planting unit 26 can also be equipped with a pesticide hopper 92 that is mounted towards a rear end of the planting unit. Hopper 92 preferably includes an insecticide and is provided with conventional dispensing apparatus for applying controlled amounts of insecticide where desired in combination with the planting of seeds by each planting unit 26.

Referring again to FIG. 1, each planting unit 26 can be coupled to an air moving system 94 that includes one or more air moving units (collectively identified as 96) enclosed in one or more housings (collectively identified as 98). While air mover unit(s) 96 is configured to provide negative pressure, they can alternatively function as blower units if a positive pressure seed metering assembly is implemented in planting units 26. Air moving system 94 includes a lower lateral tubing member 100 that is connected at its middle to one of the air moving units 96, and extends laterally outwardly therefrom in both directions. A plurality of openings (not shown) are formed in tubing member 100 that connect to a forward end of a corresponding plurality of flexible intake tubes that, in turn, connect with the corresponding metering assembly connector 88.

A bifurcated arrangement is illustrated with respect to a pair of upper lateral tubing members 102 that are connected at their laterally inner ends to one or more air mover units 96. Tubing members 102 extend parallel to, and are disposed above, tubing member 100, and are connected at their outer ends to outer tubing members 104. Outer tubing members 104 are vertically aligned with lower tubing member 100, and extend across those planting units 26 that are disposed laterally outwardly with respect to lower tubing member 100. A plurality of openings (not shown) are formed in tubing members 104 that connect to a plurality of flexible intake tubes that, in turn, connect with the corresponding metering assembly connectors 88 of laterally outwardly disposed planting units 26.

During operation, air moving units 96 draw air through the metering assemblies 86 of all planting units 26 to which the lateral tubes 100 and 104 are operably connected. The number of air mover units 96 implemented in a given seed planting assembly depends largely on the number of planting units 26 and the airflow rating of each air mover unit.

The present invention recognizes that certain seed types (for example, soybeans) are well suited to be planted in seed trenches that are laterally spaced a distance equal to the distance between adjacent seed trench opening assemblies 64 of all planting units 26 disposed on tool bar 12. However, in order to accommodate other seed types (for example, corn) that require additional distance between adjacent seed trenches in order to grow properly, it is necessary, from time to time, to raise certain planting units 26 above the ground 106.

It should thus be appreciated that the term "raised position" as used in the present application refers to a position whereby planting unit 26 has been translated upwardly to a height sufficient to cause at least the corresponding seed trench opening assembly 64 (and preferably closer disc 76 and press wheel 78) to become suspended above the ground 106. Accordingly, raised planting units 26 will not form a seed trench in the ground 106 when the seed planting assembly 10 is driven across the ground 106. In one preferred embodiment, alternating planting units can be raised from the ground 106, thereby doubling the distance between adjacent seed trenches compared to the distance that is achieved when all planting units are engaged, such as described in U.S. Pat. No. 7,111,566, the disclosure of which is incorporated herein. Additionally, each planting unit 26 may include a vertical positioner assembly and associated linkages such as described in U.S. Pat. No. 7,111,566 to raise and lower the planting unit.

Referring now to FIG. 3, a disc opener 66 is shown coupled to a caster mounting assembly 108 that allows the disc opener 66 to caster freely in a single direction. The caster mounting assembly 108 includes a stationary arm 110 coupled to a movable or castering arm 112 by a pivot connection 114. The stationary arm 110 is connected to a disc frame or drill 116 that is secured to the planting unit in a conventional manner. The stationary arm 110 may be secured to the disc frame 116 using one a number of known devices, such as a connector bracket or weld joint.

The movable arm 112 is coupled to shaft 116 extending centrally through the disc opener 66 and coupled to a center hub 118. In a preferred embodiment, the disc opener 66 is angled by approximately five to seven degrees relative to axis 120. The disc opener 66 also carries a scraper blade 122 mounted opposite of hub 118 as is known in the art. As is also known, the seed tube 90 extends between the scraper blade 122 and the disc opener 66 such that seed, fertilizer or other product is delivered into a trench through outlet 124.

In a preferred embodiment, the caster mounting assembly 108 includes a screw 126 extending through stationary arm 110. The screw 126 has a threaded body 128 extending from head 130. The stationary arm 110 has a threaded bore 132 adapted to securely receive the screw 126 when the threaded body 128 is threaded therein. The threaded body 128 terminates in a flat end 130 against which the movable arm 112 may seat. Moreover, since the screw 126 has a threaded body 128, the amount of body extending past the stationary arm 110 toward the movable arm 112 can be varied. This effectively allows for variations in the angle of the disc opener 66 relative to axis 120. More particularly, the greater the amount of threaded body 128 extending past the stationary arm 110, the larger the offset of the disc opener 66 relative to axis 120.

The stationary arm 110 and the movable arm 112 are oriented such that the pivot connection 114 is forward of hub 118 relative to the direction of travel 127. The pivot connection 114 and its position allows the movable arm 112 to caster away from the stationary arm 110 when the seed planting assembly 10 turns counterclockwise from the direction of travel 127. More particularly, when the seed planting assembly 10 turns counterclockwise the leading edge 128 of the disc opener 66 will drive into the soil and the torque placed on the leading edge 128 will be countered by movement of the movable arm 112 away from the stationary arm 110, as indicated by arrow 129, to relieve the torque applied on the disc opener 66, as illustrated in FIG. 4. The greater the angle of the disc opener 66 relative to axis 120, the greater amount of caster that will be available during turning of the seed planting assembly 10.

Figure 5:
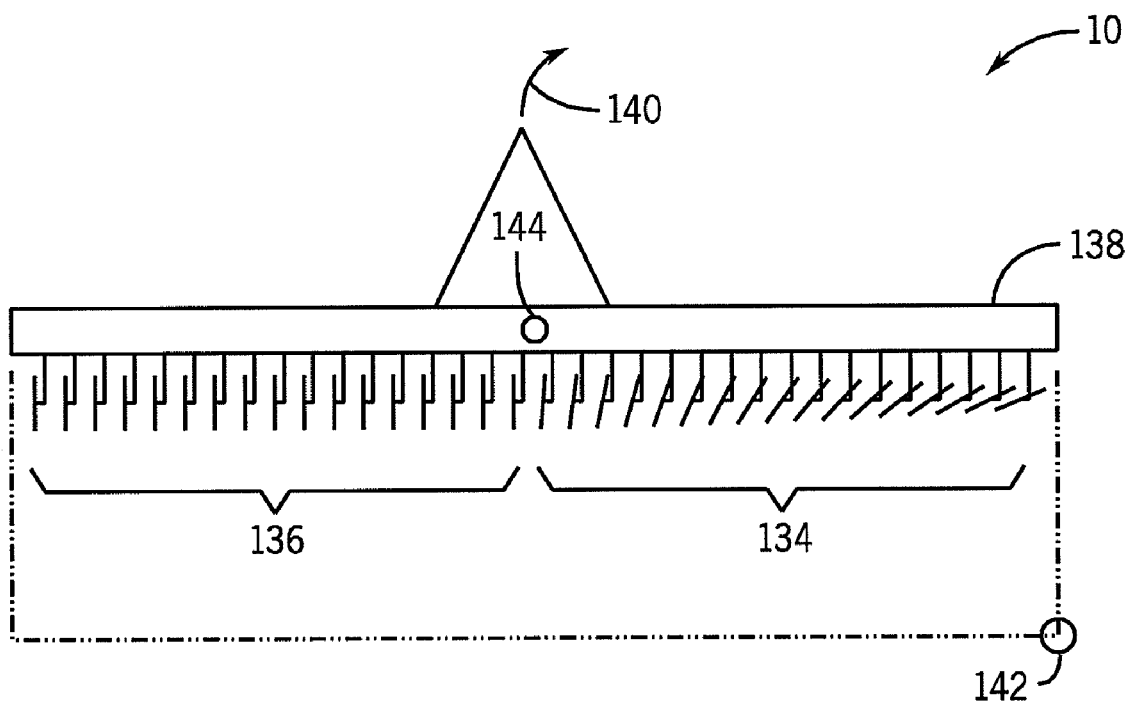
FIG. 5 is a schematic representation of a clockwise caster of some of the disc openers of the seed planting unit in response to a clockwise turn of the seed planning unit.
Figure 6:
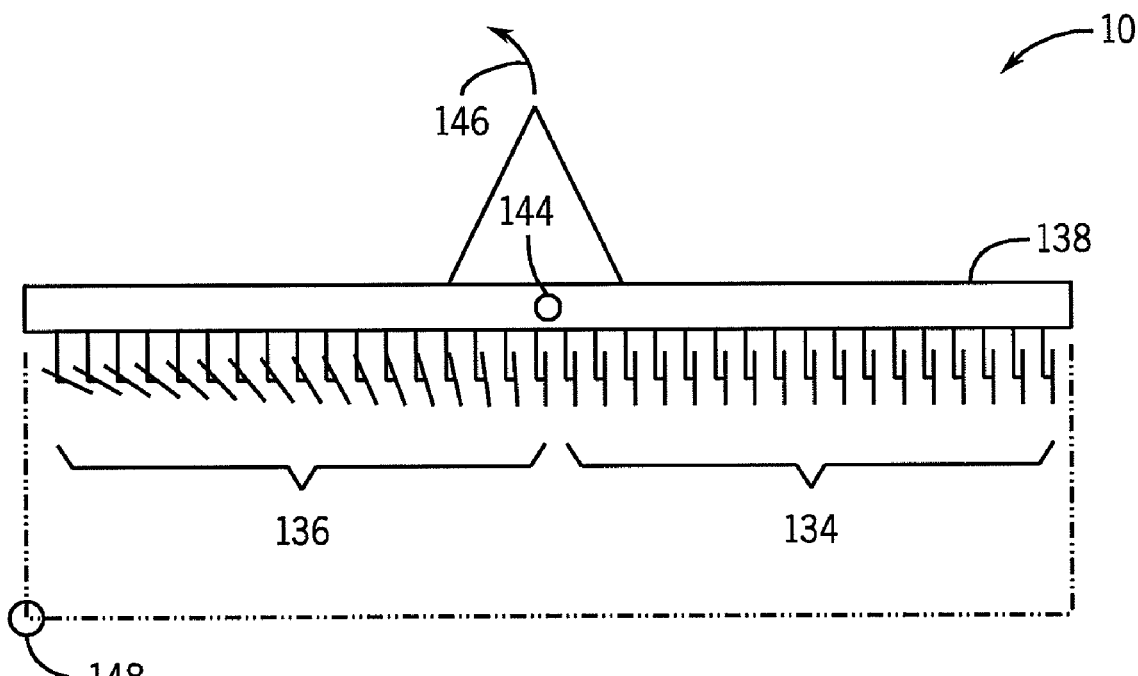
FIG. 6 is a schematic representation of a counterclockwise caster of some of the disc openers of the seed planting unit in response to a counterclockwise turn of the seed planning unit.

In one application, a seed planting unit 10 will have two sets of disc openers. More particularly, as shown in FIG. 5, the seed planting unit 10 may have a first set 134 of disc openers operative to caster in a clockwise direction and a second set of disc openers 136 operative to caster in a counterclockwise direction. The disc openers are mounted to a disc frame or drill 138. As schematically illustrated, when the seed planting unit 10 turns clockwise, shown by arrow 140, about turning point 142, the disc openers of the first 134 each caster clockwise. The degree of caster of the disc openers increases with those disc openers farthest from the center 144 of the drill 138.

The second set 136 of disc openers are designed to caster in a counterclockwise direction and thus do not caster when the seed planting unit turns clockwise. Since these disc openers are farthest from the turning point 142, they will have a larger turning radius than disc openers of set 134. As a result, the amount of torque on set 136 is less than that on set 134.

Similarly, when the seed planting unit 10 makes a counterclockwise radial turn, as represented by arrow 146, so as to turn about turning point 148, the set 136 of disc openers will caster in a counterclockwise direction whereas the set 134 of disc openers will not caster. Since the disc openers of set 134 are farthest from the turning point 148, they will have a larger turning radius than disc openers of set 136. As a result, the amount of torque on set 134 is less than that on set 136. The degree of caster of the disc openers of set 136 increases with those disc openers farthest from the center 144 of the drill 138.

Therefore, in accordance with one embodiment of the present invention, a ground opener for an agricultural planter movable along a direction of travel is presented. The ground opener includes an arm attachable to a frame of the agricultural planter and a disc mounted to the arm and adapted to form a furrow along the direction of travel. The ground opener further includes a stop pivotably mounted to the frame and adapted to allow the disc to caster in only one direction when the agricultural planter turns radially from the direction of travel.

In accordance with another embodiment, an agricultural implement movable along a direction of travel includes a drill and a first set of coulters mounted to the drill and a second set of coulters linearly spaced from the first set of coulters and mounted to the drill. The first set of coulters are operative to caster in a counterclockwise direction when the farm implement turns in a counterclockwise direction relative to the direction of travel and the second set of coulters are operative to caster in a clockwise direction when the agricultural implement turns in a clockwise direction relative to the direction of travel.

According to yet another embodiment, the present invention includes a mounting assembly for coupling a rotating disc to a drill used to furrow a field. The mounting assembly includes a stationary arm adapted to be coupled to the drill and a movable arm adapted to be coupled to the rotating disc. A pivot connection interconnects the stationary arm and the movable arm in a manner that allows the movable arm to pivot about the first connection.

While the present invention has been described with respect to a seed planting unit, it is understood that the invention could be used with other agricultural implements.

Many changes and will modifications could be made to the invention without departing from the spirit thereof. The scope of these changes will become apparent from the appended claims.

I claim:

1. A seed planting assembly for an agricultural planter movable along a direction of travel comprising:
   a laterally extending toolbar;
   a seed planting assembly including a plurality of seed planting units extending longitudinally rearwardly from said toolbar;
   said seed planting units further includes a seed hopper mounted on seed planting units;
   an air moving unit coupled to said seed planting assembly;
   said seed planting units having a frame; wherein a mounting assembly having a pair of upper support beams having opposing ends and a pair of lower support beams having opposing ends;
   one end of said pair of upper support beams and one end of said pair of lower support beams connected to said frame;
   opposing ends of said pair of upper support beams and opposing end of said pair of lower support beams connected to said tool bar;
   a ground opener having an arm attachable to said frame;
   a disc mounted to the arm and adapted to form a furrow along the direction of travel; and
   a stop pivotably mounted to the frame and adapted to allow the disc to caster in only one direction when the agricultural planter turns radially from the direction of travel.

2. The ground opener of claim 1 wherein the stop includes a stationary arm coupled to the frame and a movable arm coupled to the disc, and wherein the movable arm is movable relative to the stationary arm through a pivot connection.

3. The ground opener of claim 2 wherein the disc includes a hub to which the movable arm is coupled, and wherein the movable arm and the stationary arm are coupled to one another in such a manner that the pivot connection is oriented forward, relative to the direction of travel, of the hub of the disc.

4. The ground opener of claim 3 further comprising a scraper plate mounted adjacent the disc at a position opposite the pivot connection relative to the hub.

5. The ground opener of claim 4 wherein the disc has a leading face and a trailing face, and wherein the pivot connection is adjacent the leading face and the scraper plate is adjacent the trailing face.

6. The ground opener of claim 2 wherein the stop includes a boss extending from the stationary arm and having an end that abuts against the movable arm when the agricultural planter is traveling along the direction of travel.

7. The ground opener of claim 6 wherein the pivot connection allows the movable arm to caster away from the end of the boss when the agricultural planter turns radially inward from the direction of travel.

8. The ground opener of claim 7 wherein movement of the movable arm is limited by the end of the stop when the agricultural planter turns radially outward from the direction of travel.

9. The ground opener of claim 6 further comprising a threaded bore extending laterally through the stationary arm and wherein the boss includes a threaded shaft adapted to threadingly engage the threaded bore, and wherein a distance the threaded shaft extends from the stationary arm toward the movable arm is adjustable.

10. The ground opener of claim 9 wherein the disc has a leading face and a trailing face that is laterally offset from the leading face relative to the direction of travel by a non-zero offset.

11. The ground opener of claim 10 wherein the non-zero offset is adjustable from five degrees to seven degrees.

12. The ground opener of claim 11 wherein the amount of non-zero offset is set by adjusting the distance the threaded shaft extends from the stationary arm toward the movable arm.

13. The ground opener of claim 1 further comprising a product delivery outlet operative to deliver a product in the furrow.

14. The ground opener of claim 13 wherein the product includes seed or fertilizer.

* * * * *